(12) United States Patent
Dana et al.

(10) Patent No.: US 7,747,079 B2
(45) Date of Patent: Jun. 29, 2010

(54) METHOD AND SYSTEM FOR LEARNING SPATIO-SPECTRAL FEATURES IN AN IMAGE

(75) Inventors: Kristin Jean Dana, Spring Lake, NJ (US); Richard Mark Friedhoff, New York, NY (US); Bruce Allen Maxwell, Springfield, PA (US); Casey Arthur Smith, Ithaca, NY (US)

(73) Assignee: Tandent Vision Science, Inc., San Francisco, CA (US)

( * ) Notice: Subject to any disclaimer, the term of this patent is extended or adjusted under 35 U.S.C. 154(b) by 866 days.

(21) Appl. No.: 11/528,128

(22) Filed: Sep. 27, 2006

(65) Prior Publication Data

US 2008/0075371 A1    Mar. 27, 2008

(51) Int. Cl.
*G06K 9/48* (2006.01)

(52) U.S. Cl. .................. 382/199; 382/224; 382/108; 382/190; 382/274; 382/155

(58) Field of Classification Search .......... 382/199, 382/190, 224, 103, 154, 155, 274, 232
See application file for complete search history.

(56) References Cited

U.S. PATENT DOCUMENTS

| | | | |
|---|---|---|---|
| 4,613,269 A | 9/1986 | Wilder et al. ............... 364/513 |
| 5,214,744 A * | 5/1993 | Schweizer et al. .......... 382/103 |
| 5,506,913 A | 4/1996 | Ibison et al. ................. 382/132 |
| 5,917,948 A * | 6/1999 | Holtz .......................... 382/232 |
| 7,184,890 B2 * | 2/2007 | Boright et al. ................. 702/3 |
| 7,536,044 B2 * | 5/2009 | Zhou et al. ................... 382/128 |
| 2004/0186718 A1 | 9/2004 | Nefian et al. ................. 704/256 |
| 2006/0088207 A1 | 4/2006 | Schneiderman ............. 382/159 |
| 2006/0165258 A1 | 7/2006 | Avidan ........................ 382/103 |
| 2006/0177149 A1 | 8/2006 | Friedhoff et al. ............ 382/274 |

OTHER PUBLICATIONS

Comaniciu, Dorin et al. "Mean Shift Analysis and Applications," *The Proceedings of the Seventh IEEE International Conference on Computer Vision*. Sep. 20-27, 1999: vol. 2, pp. 1197 to 1203.
Duda, Richard O. et al. *Pattern Classification—2nd ed.* New York: John Wiley and Sons, Inc., 2001, pp. 476 to 480.
Freund, Yoav et al. "A Decision-Theoretic Generalization of On-Line Learning and an Application to Boosting." *Journal of Computer and System Sciences.* Aug., 1997, vol. 55, No. 1, pp. 119 to 139.

(Continued)

*Primary Examiner*—Samir A Ahmed
*Assistant Examiner*—Ali Bayat
(74) *Attorney, Agent, or Firm*—Davidson, Davidson & Kappel, LLC; Felix L. D'Arienzo, Jr.

(57) ABSTRACT

In a first exemplary embodiment of the present invention, an automated, computerized method is provided for determining illumination flux in an image. According to a feature of the present invention, the method comprises the steps of performing a computer learning technique to determine spatio-spectral information for the images, and utilizing the spatio-spectral information to identify illumination flux.

19 Claims, 5 Drawing Sheets

OTHER PUBLICATIONS

Hastie, Trevor et al. *The Elements of Statistical Learning—Data Mining, Inference, and Prediction*. New York: Springer Science+Business Media, 2001, pp. 299 to 309.

H. G. Barrow and J. M. Tenenbaum. Recovering intrinsic scene characteristics from images. In A. R. Hanson and E. M. Riseman, editors, Computer Vision Systems, pp. 3-26, New York, 1978. Academic Press.

Y.-C. Chung, J.-M. Wang, R. R. Bailey, S.-W. Chen, S.-L. Chang, and S. Cherng. Physics-based extraction of intrinsic images from a single image. In ICPR, pp. 693-696, 2004.

B. V. Funt, M. S. Drew, and M. Brockington. Recovering shading from color images. In ECCV, pp. 124-132, May 1992.

A. Olmos and F. A. A. Kingdom. A biologically inspired algorithm for the recovery of shading and reflectance images. Perception, 33:1463-1473, 2004.

L. Shen, P. Tan, and S. Lin. Intrinsic image decomposition with non-local texture cues. In CVPR, 2008.

M. F. Tappen, E. H. Adelson, and W. T. Freeman. Estimating intrinsic component images using non-linear regression. In CVPR, 2006.

M. F. Tappen, W. T. Freeman, and E. H. Adelson. Recovering intrinsic images from a single image. In NIPS, pp. 1367-1374, 2003.

M. F. Tappen, W. T. Freeman, and E. H. Adelson. Recovering intrinsic images from a single image. PAMI, 27(9):1459-1472, 2005.

Y. Weiss and W. T. Freeman. What makes a good model of natural images? in CVPR, 2007.

L. Xu, F. Qi, and R. Jiang. Shadow removal from a single image. In ISDA, vol. 2, 2006.

\* cited by examiner

P(1,1)  P(1,2)  · · ·           · · · P(1,M)
P(2,1)  P(2,2)
P(3,1)  P(3,2)

⋮

P(N,1) · · ·                    · · · P(N,M)

METHOD AND SYSTEM FOR LEARNING SPATIO-SPECTRAL FEATURES IN AN IMAGE

BACKGROUND OF THE INVENTION

Many significant and commercially important uses of modern computer technology relate to images. These include image processing, image analysis and computer vision applications. A challenge in the utilization of computers to accurately and correctly perform operations relating to images is the development of algorithms that truly reflect and represent physical phenomena occurring in the visual world. For example, the ability of a computer to correctly and accurately distinguish between a shadow and a material object within an image has been a persistent challenge to scientists. Such an ability can be particularly critical, for example, in computer vision applications, as may be implemented in a robot or a security camera used to identify objects moving through a selected field of view. A computer must be able to identify structures and features of a scene that can be modified in appearance due to overlying shadows. Cognitive processing of the human brain makes it possible for humans to automatically distinguish shadow from object. However, to a computer, it is all pixel values of varying color characteristics. Accordingly, there is a persistent need for the development of accurate and correct techniques that can be utilized in the operation of computers relating to images.

SUMMARY OF THE INVENTION

The present invention provides a learning technique used to identify spatio-spectral features of an image that are useful in the detection of illumination and material features of the image.

In a first exemplary embodiment of the present invention, an automated, computerized method is provided for determining illumination flux in an image. According to a feature of the present invention, the method comprises the steps of performing a computer learning technique to determine spatio-spectral information for the image, and utilizing the spatio-spectral information to identify illumination flux.

In a second exemplary embodiment of the present invention, a computer system is provided. According to a feature of the present invention, the computer system comprises a CPU and a memory storing an image file. The CPU is arranged and configured to execute a routine to perform a computer learning technique to determine spatio-spectral information for the image file, and to utilize the spatio-spectral information to identify illumination flux.

DETAILED DESCRIPTION OF THE PREFERRED EMBODIMENTS

Figure 1:
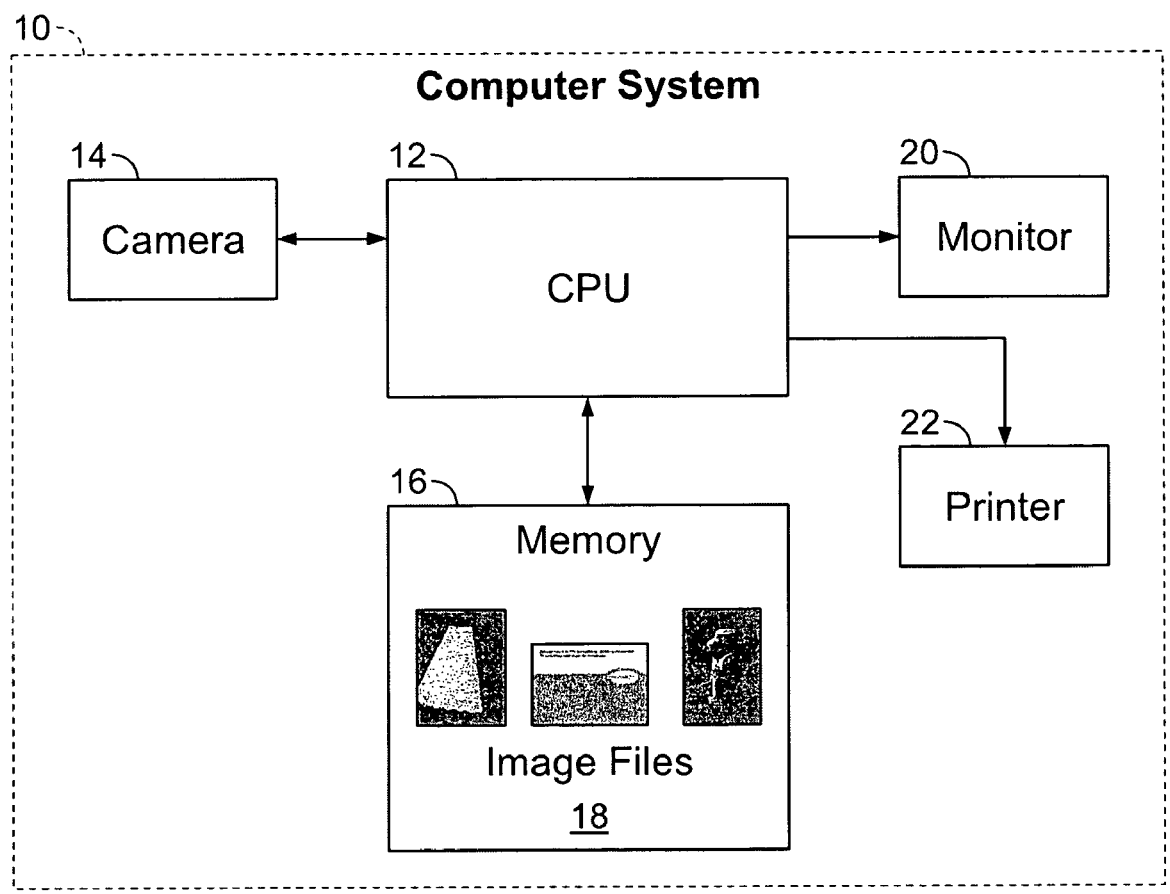
FIG. 1 is a block diagram of a computer system arranged and configured to perform operations related to images, including the recording of images.

Referring now to the drawings, and initially to FIG. 1, there is shown a block diagram of a computer system 10 arranged and configured to perform operations related to images. A CPU 12 is coupled to a device such as, for example, a digital camera 14 via, for example, a USB port. The digital camera 14 operates to download images stored locally on the camera 14, to the CPU 12. The CPU 12 stores the downloaded images in a memory 16 as image files 18. The image files 18 can be accessed by the CPU 12 for display on a monitor 20, or for print out on a printer 22.

Alternatively, the CPU 12 can be implemented as a microprocessor embedded in a device such as, for example, the digital camera 14 or a robot. The CPU 12 can also be equipped with a real time operating system for real time operations related to images, in connection with, for example, a robotic operation or an interactive operation with a user.

Figures 2, 3:
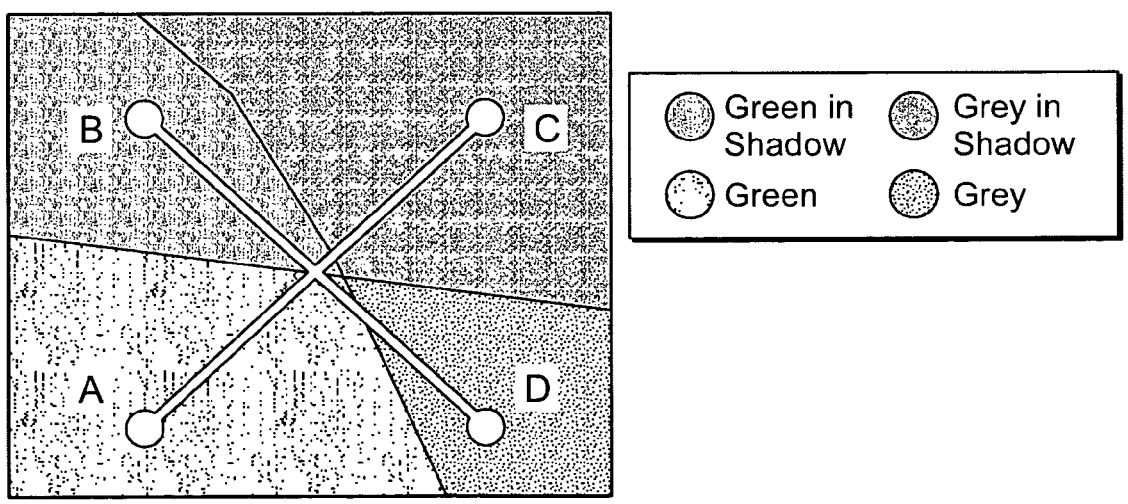
FIG. 2 shows an n X m pixel array image file for an image, as stored in the computer system of FIG. 1.
FIG. 3 shows an image having an X-junction spatio-spectral feature.

As shown in FIG. 2, each image file 18 comprises an n X m pixel array. Each pixel, p, is a picture element corresponding to a discrete portion of the overall image. All of the pixels together define the image represented by the image file 18. Each pixel comprises a digital value corresponding to a set of color bands, for example, red, green and blue color components (RGB) of the picture element. The present invention is applicable to any multi-band image, where each band corresponds to a piece of the electro-magnetic spectrum. The pixel array includes n rows of m columns each, starting with the pixel p (1,1) and ending with the pixel p(n, m). When displaying or printing an image, the CPU 12 retrieves the corresponding image file 18 from the memory 16, and operates the monitor 20 or printer 22, as the case may be, as a function of the digital values of the pixels in the image file 18, as is generally known.

In an image operation, the CPU 12 operates to analyze the RGB values of the pixels of a stored image file 18 to achieve various objectives, such as, for example, to identify spatio-spectral features of the image. Spatio-spectral features comprise conditions that are indicative of an illumination flux illuminating an image at the time the camera 14 recorded the image represented by the image file 18. An example of a spatio-spectral feature is an X-junction. An X-junction is an area of an image where a material edge and an illumination boundary cross one another. An X-junction is an optimal location for an accurate determination of illumination aspects of the image.

As taught in co-pending application Ser. No. 11/341,742, filed on Jan. 27, 2006, entitled: "Method and System For Identifying Illumination Flux In An Image," now published as U.S. Patent Application Publication No. 2006/0177149 on Aug. 10,2006, which is hereby incorporated by reference, an image comprises two components, material and illumination. Moreover, as further taught in the co-pending Application, an illumination flux impinging on a material depicted in an image is a bi-illuminant flux which comprises an ambient illuminant and a direct or incident illuminant. The incident illuminant is light that causes a shadow and is found outside a shadow perimeter. The ambient illuminant is light present on both the bright and dark sides of a shadow, but is more perceptible within the dark region of a shadow.

Spectra for the incident illuminant and the ambient illuminant of the illumination flux can be different from one another. A spectral shift caused by a shadow, i.e., a decrease of the intensity of the incident illuminant, will be substantially invariant over different materials present in a scene depicted in an image when the scene is illuminated by a common illumination flux. Thus, the spectral shift caused by a shadow can be expressed by a spectral ratio of colors across an illumination boundary defined by a shadow on a material. A spectral ratio can be defined in a number of ways such as, for example, BRIGHT/DARK, BRIGHT/(BRIGHT-DARK) and DARK/(BRIGHT-DARK), where BRIGHT is the color on the bright side of the shift and DARK is the color on the dark side. In a preferred embodiment of the present invention, the spectral ratio S=DARK/(BRIGHT-DARK) is utilized because it has been discovered during development of the present invention that the normalized value for the ratio DARK/(BRIGHT-DARK) is invariant across different geometric orientations for a material object, and thus, the ratio remains constant across illumination boundaries for objects at different orientations. Moreover, the normalized value for the ratio DARK/(BRIGHT-DARK) produced by a fully shadowed pixel and a penumbra pixel will be the same as the normalized value produced by a fully shadowed pixel and a fully lit pixel.

Inasmuch as an illumination boundary is caused by the interplay between the incident illuminant and the ambient illuminant of the illumination flux, spectral ratios throughout the image that are associated with illumination change (illuminant ratios), should be consistently and approximately equal, regardless of the color of the bright side or the material object characteristics of the boundary. A characteristic spectral ratio for a particular image or scene within an image, is a spectral ratio associated with illumination change caused by a shadow, as occurs in the particular image, and can be used to determine if a particular boundary in a scene is caused by a shadow or an object.

FIG. 3 shows an image having an X-junction, where a material edge and an illumination boundary cross one another. The hypothesis is that A and B are the same material 1, and that D and C are the same material 2, and that B and C are in shadow. In such circumstances, the reflectance ratios between materials 1 and 2 in each of the lit and shadowed areas should be approximately equal to one another. Thus, A/D=B/C. Moreover, the spectral ratios for the illumination boundary extending across the materials 1 and 2 should be approximately equal, or B/(A−B)=C/(D−C). Thus, the geometry of an X-junction provides a set of criteria that can be determined and verified through analysis of an image. Once identified, the spectral ratio information obtained from the X-junction can be applied as the characteristic spectral ratio for the image in operations such as, for example, object recognition.

Figure 4:
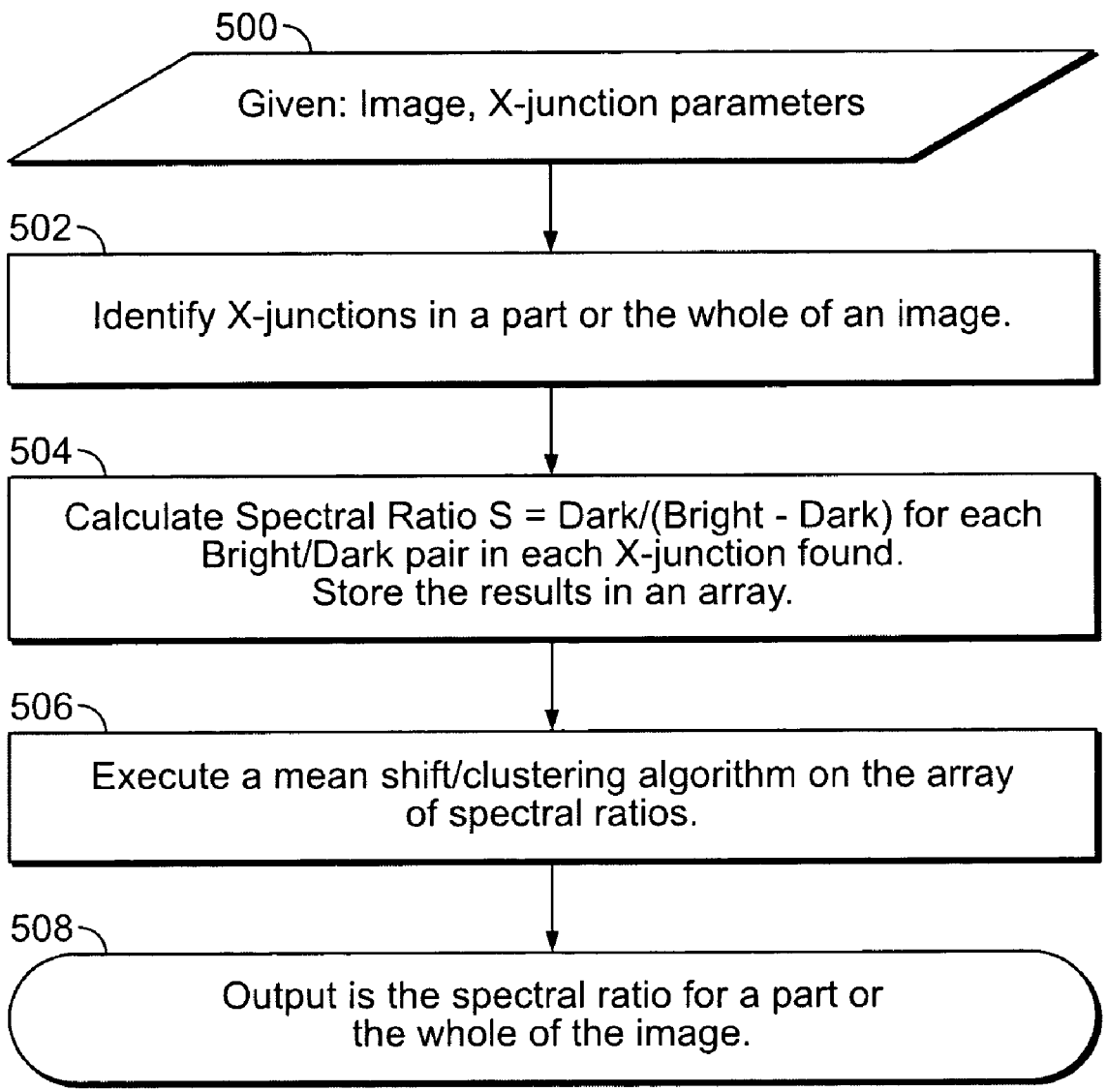
FIG. 4 is a flow chart for identifying a local spectral ratio using an X-junction spatio-spectral feature of the type depicted in FIG. 3, according to a feature of the present invention.

FIG. 4 is a flow chart for identifying a local spectral ratio using an X-junction spatio-spectral feature of the type depicted in FIG. 3, according to a feature of the present invention. The CPU 12 is given an image file 18 and X-junction parameters in step 500. The CPU 12 then proceeds to step 502, which comprises the performance of computer learning techniques to recognize the presence of spatio-spectral features, such as, for example, X-junctions, in the image of the subject image file 18.

Figure 5:
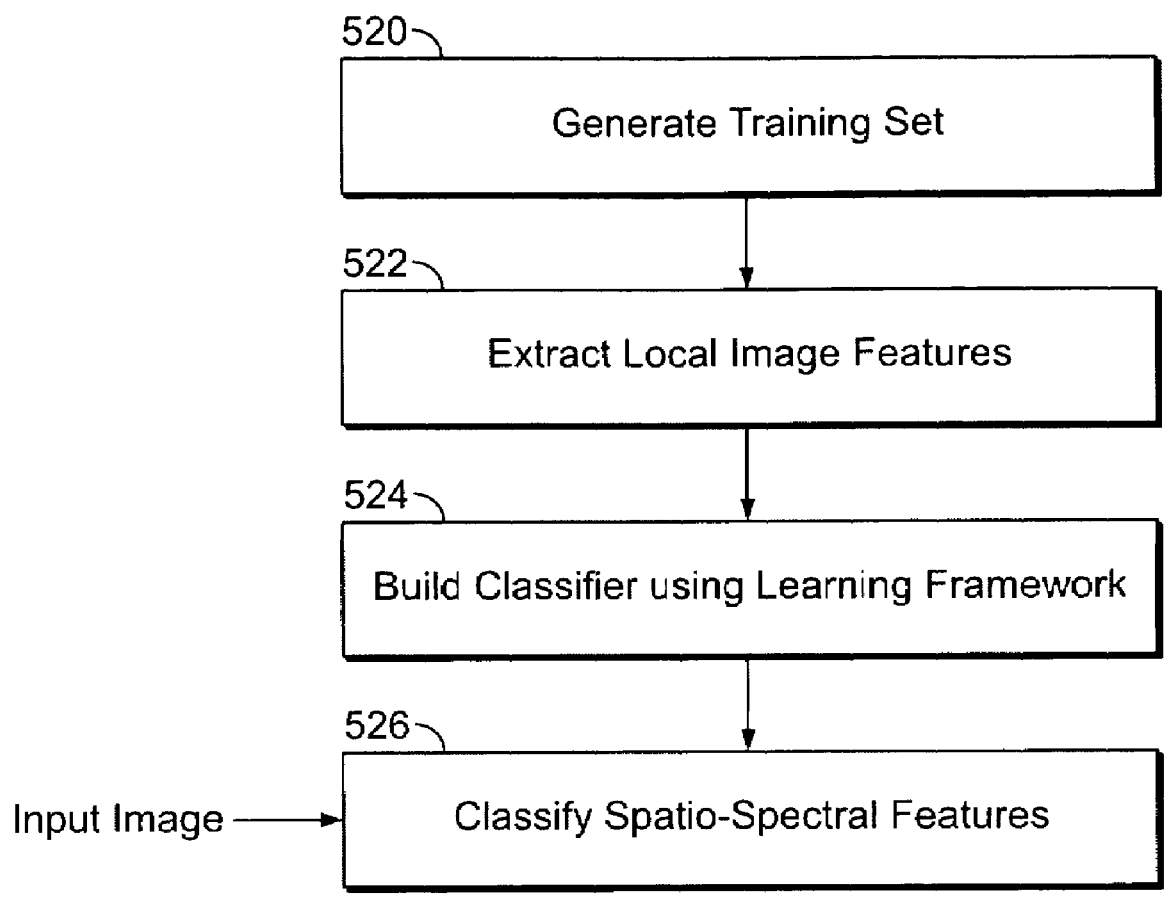
FIG. 5 is a flow chart for performing a computer learning technique to learn spatio-spectral features, according to a feature of the present invention.

FIG. 5 is a flow chart for a learning technique classification procedure implemented to learn spatio-spectral features of an image (step 502 of FIG. 4), according to a feature of the present invention. The procedure includes the steps of generating a training set (step 520), extracting local image features corresponding to the spatio-spectral features of interest (step 522), building a classifier from the training set, for use in the learning technique to identify spatio-spectral features in an image file 18 (step 524) and classification of spatio-spectral features of an image by applying the classifier to identify spatio-spectral features in the image file 18 (step 526).

In step 520, the CPU 12 operates to generate the training set. The training set comprises a set of examples of images having spatio-spectral features, in our example, X-junctions. The examples of X-junctions are positive examples of the type of features to be identified in images depicted in the image files 18. The training set also includes negative examples, images without X-junction features. For an effective and comprehensive training set, thousands of positive and negative examples are included in the set. The X-junction examples can be obtained from actual images, or by generating synthetic examples of X-junctions. A synthetic example comprises a computer generated image having the features illustrated in FIG. 3. A training set can include both actual examples and synthetic examples.

Figure 6:
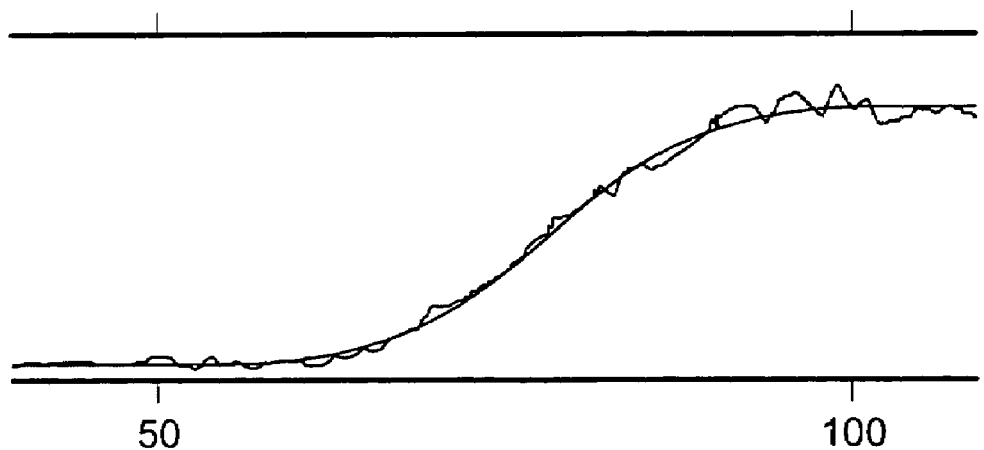
FIG. 6 is a graph showing a real shadow cross-section superimposed with a simulated shadow, according to a feature of the present invention.

Actual examples are obtained by examining images and marking areas of the images that are formed by a shadow extending across two adjacent materials. An exemplary method for generating synthetic spatio-spectral features such as X-junctions, comprises applying a shadow model with varying penumbra sizes and spectral ratios, in a range that is consistent with empirical observations of natural scenes. The spatial component of the model can be expressed by: $s(x)=g(x)*e(x)$, where $s(x)$ denotes the shadow at spatial coordinate x, $g(x)$ denotes a gaussian blurring function, and $e(x)$ denotes an ideal shadow step edge. The spacial extent of a simulated shadow can be varied as a function of the standard deviation of the $g(x)$ term. FIG. 6 is a graph showing a real shadow cross-section superimposed with a simulated shadow (jagged line), according to a feature of the present invention. The simulated shadow of FIG. 6 is obtained by blurring an ideal step edge with the size of the resulting penumbra varied by an amount consistent with variations of a natural image, and caused by changing the standard deviation of $g(x)$. As shown in FIG. 6, the simulated shadow matches an observation of a natural image.

According to a further feature of the present invention, the spectral component of the simulated shadow model is the spectral ratio, S=DARK/(BRIGHT-DARK). Variations for the spectral ratio throughout several real world images are determined and applied to the synthetic examples of X-junctions to provide a realistic set of positive examples. Moreover, additional variations for examples of the training set can include varying material colors at the material border and varying the angle between a shadow border and material.

Upon collecting examples of images having spatio-spectral features, an examination of characteristics of each example relevant to the spatio-spectral features is undertaken by the CPU 12 (step 522). As noted above, the hypothesis for X-junctions, as illustrated in the example of FIG. 3, is that the reflectance ratios between the materials 1 and 2 in each of the lit and shadowed areas should be approximately equal to one another. Thus, A/D=B/C. Moreover, the spectral ratios for the illumination boundary extending across the materials 1 and 2 should be approximately equal, or B/(A−B)=C/(D−C). Examples in an effective training set should embody characteristics of the image features to be identified (in our example, X-junctions), that can be readily and accurately determined in an image and that accurately indicate the presence of the spatio-spectral feature of interest.

Key image characteristics are used as an input to a standard classifier, for example, an Adaboost classifier. The Adaboost classifier, in turn, uses the image characteristics to build a profile of an X-junction appearance, as is known in the art. Adaboost is a term of art indicating "adoptive boosting." The Adaboost classifier is described in "A Decision Theoretic Generalization of On-Line Learning and an Application to Boosting," Journal of Computer and System Sciences 55 (1997), pp. 119-139.

According to a feature of the present invention, the following characteristics of an X-junction are determined (step 522) for each positive sample in the training set, to provide a feature vector for each positive example:
1. Distance between bright pixels of the X-junction example
2. Absolute difference of average brightness of bright pixels
3. Dark/Bright for Material 1 *r* (red channel)
4. Dark/Bright for Material 1 *g* (green channel)
5. Dark/Bright for Material 1 *b* (blue channel)
6. Dark/Bright for Material 2 *r* (red channel)
7. Dark/Bright for Material 2 *g* (green channel)
8. Dark/Bright for Material 2 *b* (blue channel)
9. Squared Difference of Reflectance Ratio 2/1 (to compare Dark/Bright) (red channel)
10. Squared Difference of Reflectance Ratio 2/1 (to compare Dark/Bright) (green channel)
11. Squared Difference of Reflectance Ratio 2/1 (to compare Dark/Bright) (blue channel)
12. Squared Difference of Spectral Ratio (to compare 1 and 2) (red channel)
13. Squared Difference of Spectral Ratio (to compare 1 and 2) (green channel)
14. Squared Difference of Spectral Ratio (to compare 1 and 2) (blue channel)
15. Number of inliers for first line fit
16. Number of inliers for second line fit
17. Number of outliers for line fits
18. Variance of tilt angle for fitted planes (a spatial plane is fit for the four regions)
19. Average error of plane fitting
20. Feature 20-31 are the RGB values in the 4 regions (the set {A, B, C, D} in our example, FIG. 3) defined by an X-junction.

A classifier is built from a learning framework provided by the feature vectors extracted from the positive samples of the training set (step 524). In our example, an Adaboost classifier is built. The classifier provides a computational decision process based on local image features, as represented by the feature vectors. The Adaboost classifier uses adaptive boosting. Boosting is a classifier that collects information from a set of sub-classifiers or "weak learners". A sub-classifier or "weak learner" has accuracy only slightly better than even chance. A simple linear classifier can be used here.

As an alternative to the preselected set of thirty one characteristics for a feature vector, a large set of possible features and characteristics is generated, for example, by considering relationships among pixels and blocks of pixels in a spatio-spectral feature such as an X-junction. A Probabilistic Learning Tree is then used to determine the most useful characteristics from the large set of possible features. The selected most useful characteristics are then utilized as a basis, for example, of a feature vector used to build a classifier.

In order to identify the four main regions of a prospective X-junction (set {A, B, C, D}, the feature vectors provide a basis for feature identification of the prospective X-junction. Thus, either the thirty one characteristics selected above or the output of a Probabilistic Learning Tree, provide accurate indications whether a four region area of an image comprise an X-junction. For example, the ratio of dark to bright is a characteristic that is relevant to a region that is shadowed. Regarding characteristics 15-17, two lines are fit to the edge pixels of each of the positive X-junction examples, for example, using a common robust estimator such as RANSAC. A robust estimator identifies "inliers" of the fit. The inliers are the edge pixels that lie on one of the two lines. The outliers are the edge pixels that do not lie on one of the two lines. The inlier and outlier relationships are relevant to X-junction characteristics.

For characteristics 18 and 19, a spatial plane is fit to the average intensity of each region of each of the positive examples. The parameters of a spatial plane indicate direction and rate of intensity change in the respective region of the positive X-junction example. If the parameters of a region of a prospective X-junction indicate a zero slope plane, the corresponding region is homogeneous. If all four regions of the prospective X-junction have the same tilt angles, the regions may be in the same penumbra. Thus, the tilt angle characteristics (characteristic 18) can be used to support a conclusion that an area of an image is or is not an X-junction. The average error of a plane fitting (characteristic 19) is also indicative of an X-junction.

As a simple conceptual example illustrating a linear classifier, consider a two-dimensional feature vector so that all the training features lie in a two dimensional grid. Choose a line that divides the grid so that the line can be used as a classifier, i.e. feature points below the line are classified the same. The line is chosen to best classify the training data which is easy to do since the true classification of the training data is already known.

A description of how boosting works is given in Richard O. Duda, Peter E. Hart, and David G. Stork, *Pattern Classification*, John Wiley & Sons, Inc., 2001 (pp. 476-480) and Trevor Hastie, Robert Tibshirani, and Jerome Friedman, *The Elements of Statistical Learning*, Springer, 2001, (pp. 299-309). The boosting description of the Pattern Classification reference can be summarized by the following procedural steps:

Select a subset $n_1$ of the n patterns from the training set D to get $D_1$.

Create a sub-classifier $C_1$ with $D_1$. ($C_1$ can also be called a weak learner).

Choose a second training set $D_2$ such that $C_1$ classifies half of $D_2$ wrong. (The idea is that $D_2$ provides information complementary to $D_2$.) Create sub-classifier $C_2$.

Choose $D_3$ by choosing the training examples such that $C_1$ and $C_2$ do not agree Continue process until some threshold of training error is achieved or until there are no more training examples. The final classification is based on votes of the sub-classifiers.

In step 526, the CPU 12 applies the classifier in an analysis of the image depicted in the subject image file 18. From standard brightness edge boundary segment information for the image, the CPU 12 determines crossing boundaries. At the intersection of each crossing boundary pair located within the image, the CPU 12 performs an analysis of each array of pixels within four regions of the image defined by and surrounding each example of intersecting boundaries. The Adaboost classier is used to determine in each case, whether the respective four region set of pixels exhibits characteristics that match the feature vector framework upon which the classifier was built. If yes, the CPU 12 classifies the intersecting boundaries of a particular case, as an X-junction.

Upon identification of the X-junctions present in the subject image file 18, the CPU 12 proceeds to step 504 (FIG. 4). In step 504 the CPU 12 calculates a spectral ratio for each bright/dark pixel pair in each X-junction, and stores the results in a memory array. In step 506, the CPU 12 executes a mean shift algorithm on the array of spectral ratios. The mean shift algorithm can comprise, for example, an algorithm described in "Mean shift analysis and applications," Comaniciu, D.; Meer, P.; Computer Vision, 1999, The Proceedings of the Seventh IEEE International Conference on; Volume 2, 20-27 September, 1999; Pages 1197-1203. The output of execution of the mean shift algorithm (step 508) is a characteristic spectral ratio for all or a specific local region of the image. The execution of step 506 can include a survey of values for the spectral ratios throughout the image.

If the spectral ratios calculated over the image by, for example, one of the methods described above, vary by an amount>a threshold variance, a local approach will be implemented for the spectral ratio information used in determining illumination boundaries. That is, the value at a specific X-junction, or a mean or median of a set of nearby X-junctions will be used as the spectral ratio when the CPU 12 determines illumination boundaries in the region of the image near the specific X-junction. If all of the spectral ratios for the entire image vary by less than the threshold variance, a global approach can be used with the same mean shift spectral ratio used in all illumination boundary determinations.

Figure 7:
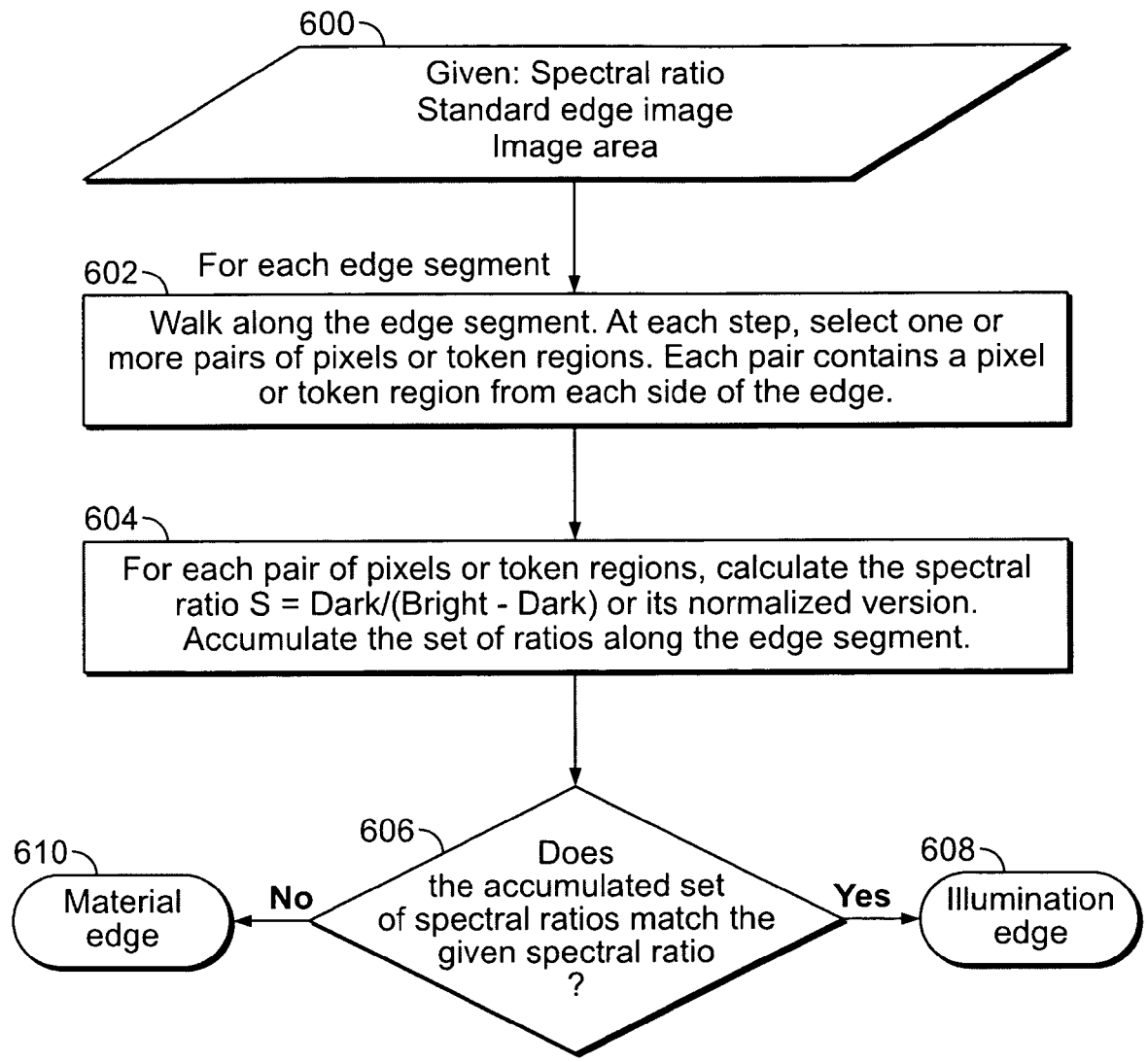
FIG. 7 is a flow chart for identifying material and illumination using ratio matching, according to a feature of the present invention.

As discussed above, the characteristic spectral ratio is used to identify illumination boundaries in an image. FIG. 7 is a flow chart for identifying material and illumination using ratio matching, according to a feature of the present invention. More specifically, the routine of FIG. 7 identifies illumination flux comprising an illumination boundary. In step 600, the CPU 12 is given spectral ratio information for an image determined through execution of the routine of FIG. 4, and standard brightness edge boundary segment information for the image. For each brightness edge segment of the image, in step 602, the CPU 12 traverses the edge by selecting, for example, pixel pairs, each pair comprising a pixel from the bright side of an edge segment and a pixel from the dark side of the edge segment.

In step 604, for each pair of pixels, the CPU 12 calculates a spectral ratio, S=Dark/(Bright-Dark) and accumulates the S values for all the pairs along the corresponding edge segment. In step 606, the CPU 12 decides if the accumulated set of S values for an edge segment matches the given characteristic spectral ratio information. As discussed above, the given spectral ratio information can be a global value for the image or a local value for the part of the image where the edge segment is located. If there is a match of spectral ratios, the CPU 12 marks the edge segment as an illumination boundary (step 608). If there is no match, the CPU 12 marks the edge as a material edge (step 610).

In the preceding specification, the invention has been described with reference to specific exemplary embodiments and examples thereof. It will, however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. An automated, computerized method for determining illumination flux in an image, comprising the steps of:
    a computer executing the following steps:
    performing a computer learning technique to determine spatio-spectral information for the image as a function of spatio-spectral characteristics relevant to illumination; and
    utilizing the spatio-spectral information to identify illumination flux in the image.

2. The method of claim 1 wherein the step of performing a computer learning technique to determine spatio-spectral information for the image is carried out by using a training set.

3. The method of claim 2 wherein the training set comprises positive examples and negative examples.

4. The method of claim 3 wherein the positive examples comprise synthetic examples of spatio-spectral features.

5. The method of claim 3 wherein the training set comprises a feature vector set, the set including a feature vector for each positive example of the training set, each feature vector defined by characteristics of the spatio-spectral information.

6. The method of claim 5 comprising the further step of building a classifier as a function of the feature vector set.

7. The method of claim 6 comprising the further step of using the classifier to identify spatio-spectral information.

8. The method of claim 6 wherein the classifier comprises an Adaboost classifier.

9. The method of claim 5 wherein the characteristics are selected by a Probabilistic Learning Tree.

10. The method of claim 1 wherein the spatio-spectral information comprises a characteristic spectral ratio.

11. The method of claim 10 comprising the further step of using the characteristic spectral ratio to identify illumination flux in the image.

12. The method of claim 11 wherein the illumination flux comprises an illumination boundary.

13. An automated, computerized method for determining illumination flux in an image, comprising the steps of:
    a computer executing the following steps:
    performing a computer learning technique to determine spatio-spectral information for the image, the spatio-spectral information comprising an X-junction; and
    utilizing the X-junction spatio-spectral information to identify illumination flux.

14. The method of claim 13 comprising the further step of using the X-junction to calculate a characteristic spectral ratio for the image.

15. The method of claim 14 comprising the further step of using the characteristic spectral ratio to identify illumination flux in the image.

16. The method of claim 15 wherein the illumination flux comprises an illumination boundary.

17. A computer system which comprises:
    a CPU; and
    a memory storing an image file;
    the CPU arranged and configured to execute a routine to perform a computer learning technique to determine spatio-spectral information for the image file as a function of spatio-spectral characteristics relevant to illumination, and utilize the spatio-spectral information to identify illumination flux in an image depicted in the image file.

18. A computer program product, disposed on a computer readable media, the product including computer executable process steps operable to control a computer to: perform a computer learning technique to determine spatio-spectral information for an image file as a function of spatio-spectral characteristics relevant to illumination, and utilize the spatio-spectral information to identify illumination flux in an image depicted in the image file.

19. A computer program product, disposed on a computer readable media, the product including computer executable process steps operable to control a computer to: perform a computer learning technique to determine spatio-spectral information for the image, the spatio-spectral information comprising an X-junction and utilize the spatio-spectral information to identify illumination flux.

* * * * *